United States Patent [19]

Goedert

[11] Patent Number: 5,345,340
[45] Date of Patent: Sep. 6, 1994

[54] PLURAL PASS VISION SYSTEM

[75] Inventor: Robert V. Goedert, Oakland County, Mich.

[73] Assignee: The United States of America as represented by the Secretary of the Army, Washington, D.C.

[21] Appl. No.: 64,322

[22] Filed: May 20, 1993

[51] Int. Cl.$^5$ ................................. G02B 5/22
[52] U.S. Cl. ................... 359/885; 351/213; 359/600; 359/853; 359/894
[58] Field of Search ............... 359/227–228, 359/601, 614, 641, 722, 726, 727, 738, 885, 886, 222, 402, 600, 851, 853, 857, 894; 351/44, 213; 2/15, 426, 431–432

[56] References Cited

U.S. PATENT DOCUMENTS

3,620,597  11/1971  Schartz ............................. 351/44
5,220,463   6/1993  Edelstein et al. .................. 359/857
5,283,697   2/1994  Tutt et al. ......................... 359/885

Primary Examiner—Loha Ben
Assistant Examiner—James Phan
Attorney, Agent, or Firm—Peter A. Taucher; David L. Kuhn

[57] ABSTRACT

Disclosed herein is an optical system which allows light below a given fluence to pass but which blocks light above the given fluence so that a human viewer using the system is not harmed by high energy lasers directed at the system. The optical system concentrates incoming light at a first focal zone in a NLASM, or nonlinear absorbing or scattering material. During a time delay, the system reconcentrates the light at a second focal zone to which the plasma zone has had time to expand. The character and number of light concentrations in the NLASM can be varied to protect the human viewer from a wider range of harmful light fluences.

12 Claims, 6 Drawing Sheets

PLURAL PASS VISION SYSTEM

GOVERNMENT USE

The invention described herein may be manufactured, used and licensed by or for the U.S. Government for governmental purposes without payment to me of any royalty thereon.

BACKGROUND

Combat vehicles typically have vision blocks, periscopes or other optical instruments with which a soldier in the vehicle can look out of the vehicle during combat. One danger of using these instruments is an enemy laser beam directed at the instrument to blind the soldier using it. The laser beam is typically "agile" in that it can vary greatly in intensity, pulse length, and wavelength, and current viewer protection technology can not protect the viewer over the entire range of agile laser wavelengths.

My invention uses a nonlinear absorbing or scattering material, or NLASM, to provide protection against agile lasers. NLSAMs absorb or scatter more completely at higher light levels than at lower light levels and include the following mechanisms: suspension cell limiters, two-photon absorbers, gas plasma breakdown cells, and non-linear index changing systems. For convenience there follows a brief discussion of each type of NLASM.

Suspension cell limiters. Suspension cell limiters are liquid filled cells having solid particles suspended in the liquid, the particles selectively absorbing light whose intensity exceeds some threshold level. The suspension cell limiter's liquid is usually an alcohol and the suspended particles are typically carbon, but other materials can be used. To use a suspension cell limiter, an incoming laser beam above the threshold intensity level is focussed to a point in the cell. Atoms of the particles in the suspension absorb energy from the laser beam. If enough energy is absorbed, electrons are freed from these atoms and form a collection of free ions called a plasma. The plasm then absorbs further energy from the laser beam.

A suspension cell limiter may be regarded as having four possible conditions, the condition at a given time depending on the intensity or fluence (light flow rate, expressed in Joules per square centimeter) upon the cell. The first condition exists when the fluence level is too low to cause plasma formation within the cell. In this case the cell is a passive light transmitter where the suspended particles filter out a percentage of the light that depends the particles concentration. The second condition occurs within a so called pre-clamping range of fluence levels, this range being above the threshold for plasma formation but insufficient to cause a phenomenon referred to as "clamping." Within the pre-clamping range of fluences, the plasma absorbs a part of the light attempting to pass through the cell, the increase in fluence attenuation by the plasma being roughly directly proportional to the increase in incident fluence. The third condition of the suspension cell limiter occurs at a critical level bordering the upper end of the pre-clamping range. At this critical fluence level, any increase in fluence incident upon the cell is completely absorbed by the plasma. In other words the cell's throughput of fluence is at a local maximum the upper end of the pre-clamping range. At a still higher critical fluence level, there occurs the limiter's fourth condition, where the limiter's plasma can absorb or block no more laser light. All fluence above this latter critical level passes unattenuated through the cell. The fluence values at which attenuation begins, clamping begins, and clamping ends depend on a number of parameters, including cell depth, the concentration of the suspended material, the type of suspended material, the liquid in the cell and the wavelength of the light. As an example, a typical suspension cell limiter has carbon particles suspended in alcohol at a concentration that filters out 10% of ambient light. Such a limiter typically begins fluence attenuation at fluences between 0.1 and 1 Joules per square centimeter. Clamping for such a suspension cell limiter occurs typically between 1 and 100 Joules per square centimeter, and clamping typically ends at 1500 Joules per square centimeter.

Two-photon absorbers. Normal linear absorption of light by a material, such as a colored dye, occurs when an incoming photon has an energy equal to that required to excite an electron in the material from a ground state to an excited state. This absorption of light is considered linear since a constant percentage of incident photons is absorbed regardless of the number of incident photons, at least until bleaching, which is not discussed here. Some materials exhibit nonlinear absorption if the necessary concentration of incident photons occurs. The atomic electronic structure for these materials may be such that the energy needed to transit one of its electrons to the first excited state may be close to, but not exactly equal to, the energy of a single incident photon, whereby the percentage of incident photons absorbed is low. However, this atomic structure may be such that the energy needed for transition of the electron from the first excited state to a second excited state may correspond well to the energy of the incident photon. Therefore, any electrons that absorb a photon and move from the ground state to the first excited state will surely absorb a second photon and move to the second excited state, if second photons are available. Material having such electrons absorbs nonlinearly since it absorbs a greater percentage of incoming photons when these photons are more concentrated. The differential absorption for more conentrated photons occurs because incoming photons are available for electrons that have absorbed a first photon and have not lost the energy thereof.

Gas plasma breakdown cell. In a gas plasma cell, a portion of high energy light incident thereon is absorbed by gaseous molecules in the cell. Electrons from the molocules form a plasma which absorbs and scatters the remaining incident light. At low incident light levels, there is not enough energy to induce a plasma and the light simply passes through the cell.

Non-linear index changing system. A non-linear index material has a first index of refraction for low energy light and a second index of refraction for high energy light. Such a material could be formed into small spheres and put into a cell containing fluid whose index of refraction matches the first index of refraction for the material. Since the spheres are index matched with the fluid, they will not be visible under normal viewing conditions. But when high energy light impinges on the spheres, their index of refraction changes and they become light scattering centers.

SUMMARY OF THE INVENTION

My invention uses a nonlinear absorbing or scattering material (NLASM) in a viewing instrument for a combat vehicle. My invention routes the incoming light through the NLASM a number of times and focusses the light at the same focal area on at least two of the passes. In certain variations of my invention, the size, number and juxtaposition of multiple focal areas are controlled to maximize the range of laser intensities over which my invention will afford eye protection from laser beams.

DETAILED DESCRIPTION

Figure 1:
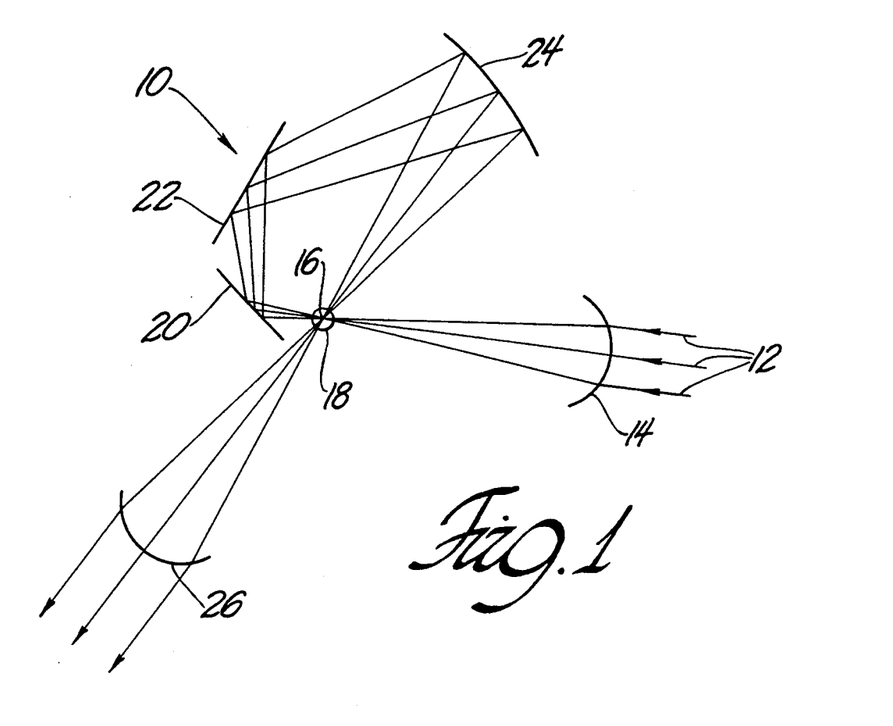
FIG. 1 is a schematic diagram showing the juxtaposition of lenses, mirrors and NLSAM in a first embodiment of my invention.

In FIG. 1 is an optical system 10 wherein parallel laser light rays 12 pass through convex lens 14 and thereafter converge to focal point or focal zone 16 within NLSAM 18, which is typically but not necessarily a suspension cell limiter. Typically, NLASM 18 is formed as a cylindrically shaped body whose axis is perpendicular to the plane of FIG. 1, but NLASM can also be spherical. In FIG. 1, NLASM 18 has exactly the same index of refraction as the medium surrounding it, whereby the NLASM does not act as a lens. NLASM 18 is designed so that light below a selected fluence or intensity will pass through focal point 16 without causing plasma formation in the NLASM. The selected intensity is preferably below the level at which discomfort is experienced by the human eye. Light above the selected intensity will cause plasma formation to begin at the focal point and thereafter spread from the focal point. The extent and density of plasma formation will become sufficient within a short time interval to completely absorb, or clamp, light above the selected intensity. For most laser light intensities relevant to eye protection, I believe that the plasma formation interval will be two to three nanoseconds or less. During the plasma formation interval and before the plasma begins clamping, some of light above the selected intensity will pass through NLASM 18.

Light rays 12 exiting NLASM 18 will be reflected first off flat mirror 20, then off flat mirror 22, and then off concave mirror 24, whereupon the light rays will refocus at focal zone or point 16. It is preferred that the path length of rays exiting the NLASM and returning to point 16 be at least approximately 32.4 inches, which causes a delay time of at least three nanoseconds before the light rays refocus at point 16. The delay time of three nanoseconds assures that sufficiently large and dense plasma formation has occurred at point 16 to absorb light above the selected intensity before light rays 12 make a second pass through point 16. Of course, the path of the rays exiting the NLASM for the first time and then returning to point 16 can be lengthened or shortened, depending on the desired duration of the plasma formation interval.

Light rays 12 need not refocus precisely at point 16 so long as they concentrate at a zone (not necessarily a point) in the plasma dense enough to clamp light above the selected intensity. As a result of the second passage of rays 12 through NLASM 18, all light above the selected intensity level will be absorbed by NLASM 18. After rays 12 exit NLASM 18 the second time they pass through concave lens 26, which rearranges rays 12 to their mutually parallel juxtaposition they had before entering convex lens 14. These rays will then go to the human viewer (not shown).

Figure 2:
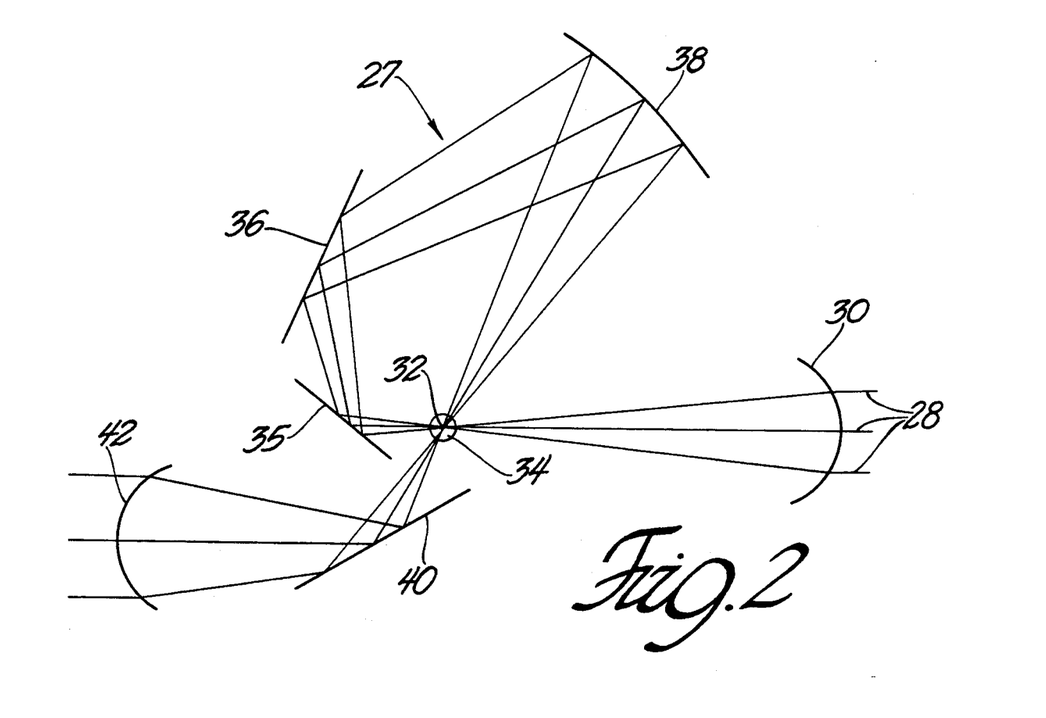
FIG. 2 is a schematic diagram showing the juxtaposition of lenses, mirrors and NLSAM in a second embodiment of my invention.

FIG. 2 shows an optical system 27 that is a slight modification of the FIG. 1 system, the chief difference of system 27 being that light rays 28 enter and leave the system in the same direction, whereby a human viewer using the system faces the object he is viewing. In FIG. 2, parallel laser light rays 28 enter the system through lens 30 and are focussed by that lens at a focal point or focal zone 32 inside NLASM 34. Rays 28 then exit NLASM 34, reflect off a first flat mirror 35, then reflect off a second flat mirror 36 and then reflect off a concave mirror 38, whereupon the rays are refocused at or near focal zone 32. Rays 28 then again exit NLASM 34, reflect off a third flat mirror 40 and pass through concave lens 42, whereupon rays 28 resume parallel relative juxtaposition.

Figure 3:
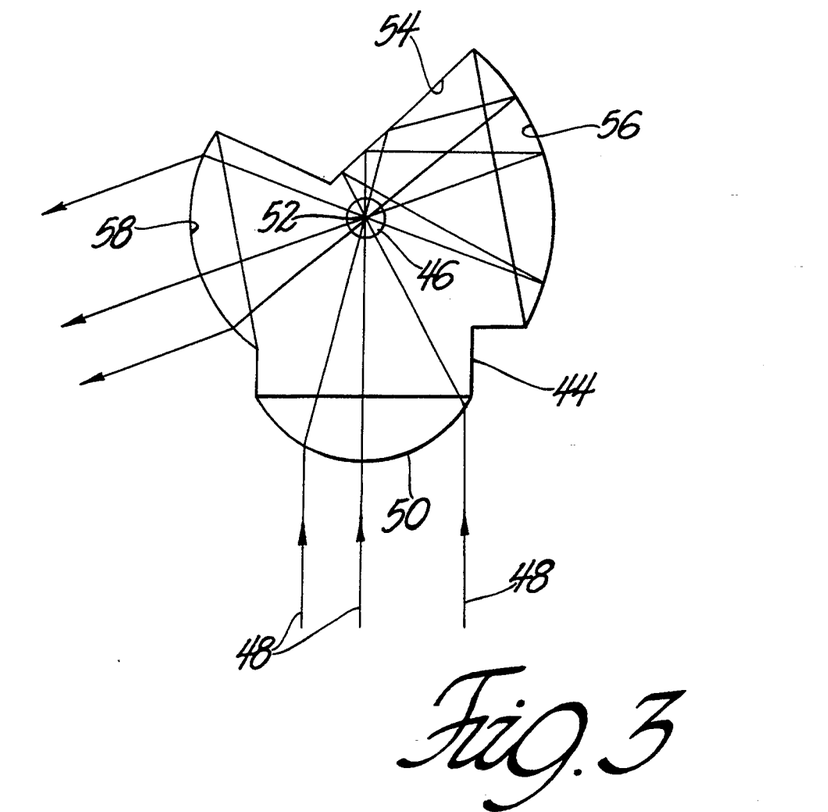
FIGS. 3 and 4 show an acrylic or glass body incorporating the NLSAM, lenses and mirrors of a third embodiment of my invention, FIG. 3 being a top elevational view and FIG. 4 being a front elevational view. Arrows representing light rays in FIG. 3 are omitted for convenience from FIG. 4.
Figure 4:
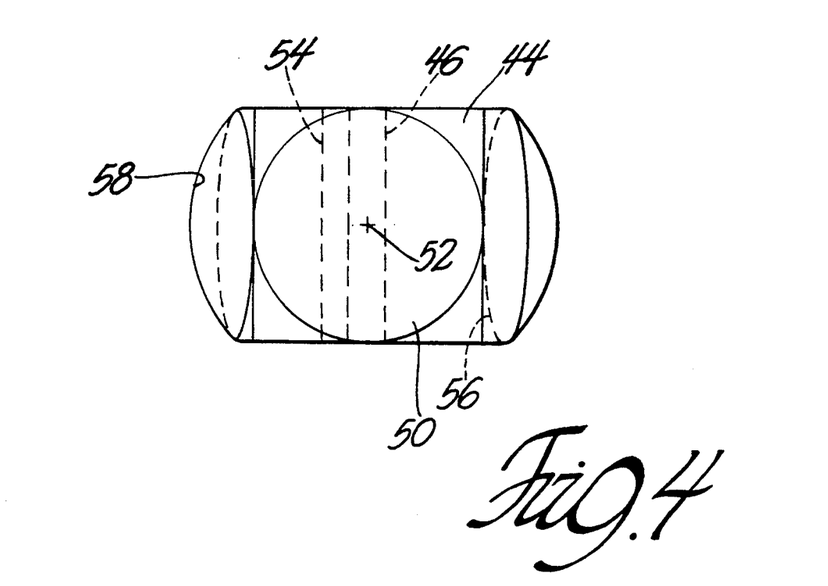

FIGS. 3 and 4 depict still another version of my optical system embodied as a monolithic block 44 of acrylic, glass or other suitable transparent material. Block 44 defines a cylindrical cavity containing NLASM 46. This NLASM is typically a suspension cell limiter comprised of carbon particles suspended in an alcohol and this NLASM has the same index of refraction as the material of block 44. Parallel light rays 48 enter block 44 at circular, externally convex surface 50, which focuses these rays at focal zone 52 in NLASM 46 so as to form plasma in the NLASM if the light exceeds a selected fluence. Rays 48 exit NLASM 46 and strike a flat, totally internally reflective surface 54 and then deflect to internally concave reflective surface 56, which reconcentrates the rays at or near focal zone 52. Rays 48 then again exit NLASM 46 and pass out of block 44 through internally concave lens surface 58, whereupon rays 48 resume their original parallel relation to one another.

Figure 12:
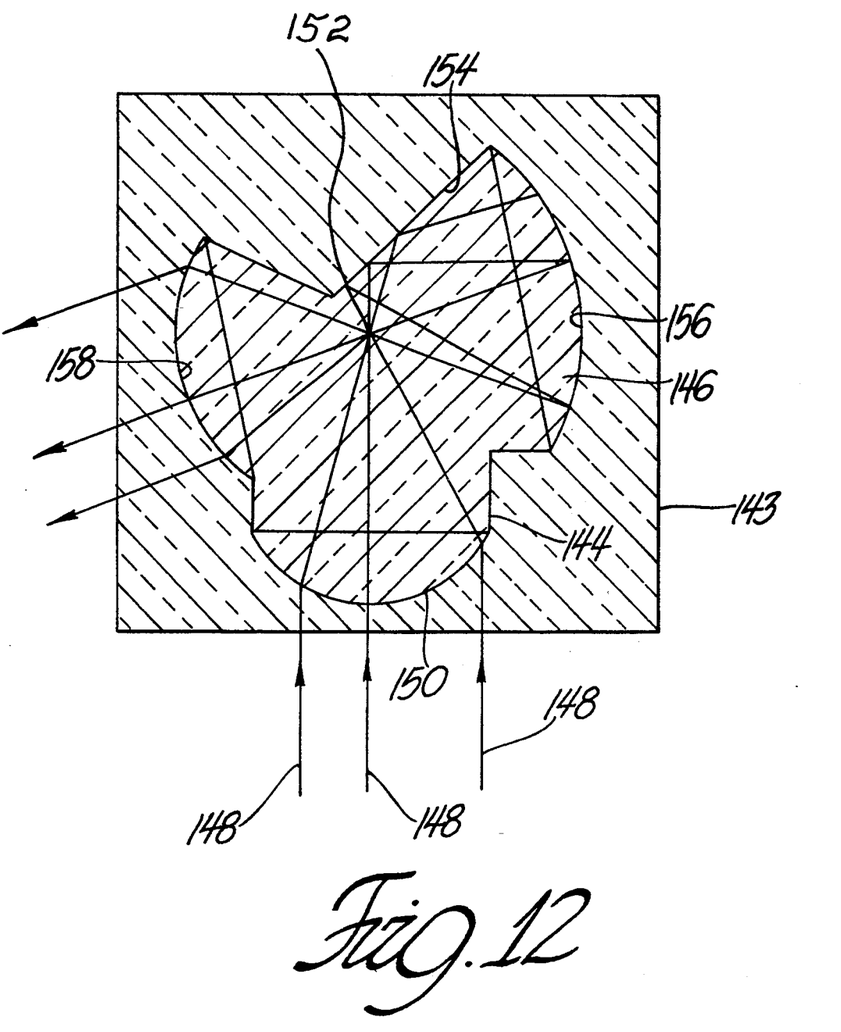
FIG. 12 is a sectional view of an acrylic block hollowed to define a cavity shaped like the acrylic block shown in FIGS. 3 and 4.

FIG. 12 is a variation of the FIG. 3 embodiment wherein a monolithic block 143 of acrylic, glass or other suitable transparent material has a cavity 144 defined therein. Cavity 144 has the same shape as block 44 in FIG. 3 and is filled with NLASM 146, which must have a higher index of refraction than block 143. Parallel light rays 148 enter NLASM 146 at circular, externally Convex surface 150, which focuses these rays at focal zone 152 in NLASM 146 so as to form plasma in the NLASM if the light exceeds a selected fluence. Rays 148 exit NLASM 146 and strike a flat, totally internally reflective surface 154 and then deflect to internally concave reflective surface 156, which reconcentrates the rays at or near focal zone 152. Rays 148 then again exit NLASM 146 and pass out of block 143 through internally concave lens surface 158, whereupon rays 148 resume their original parallel relation to one another.

Figures 5, 6, 7, 8:
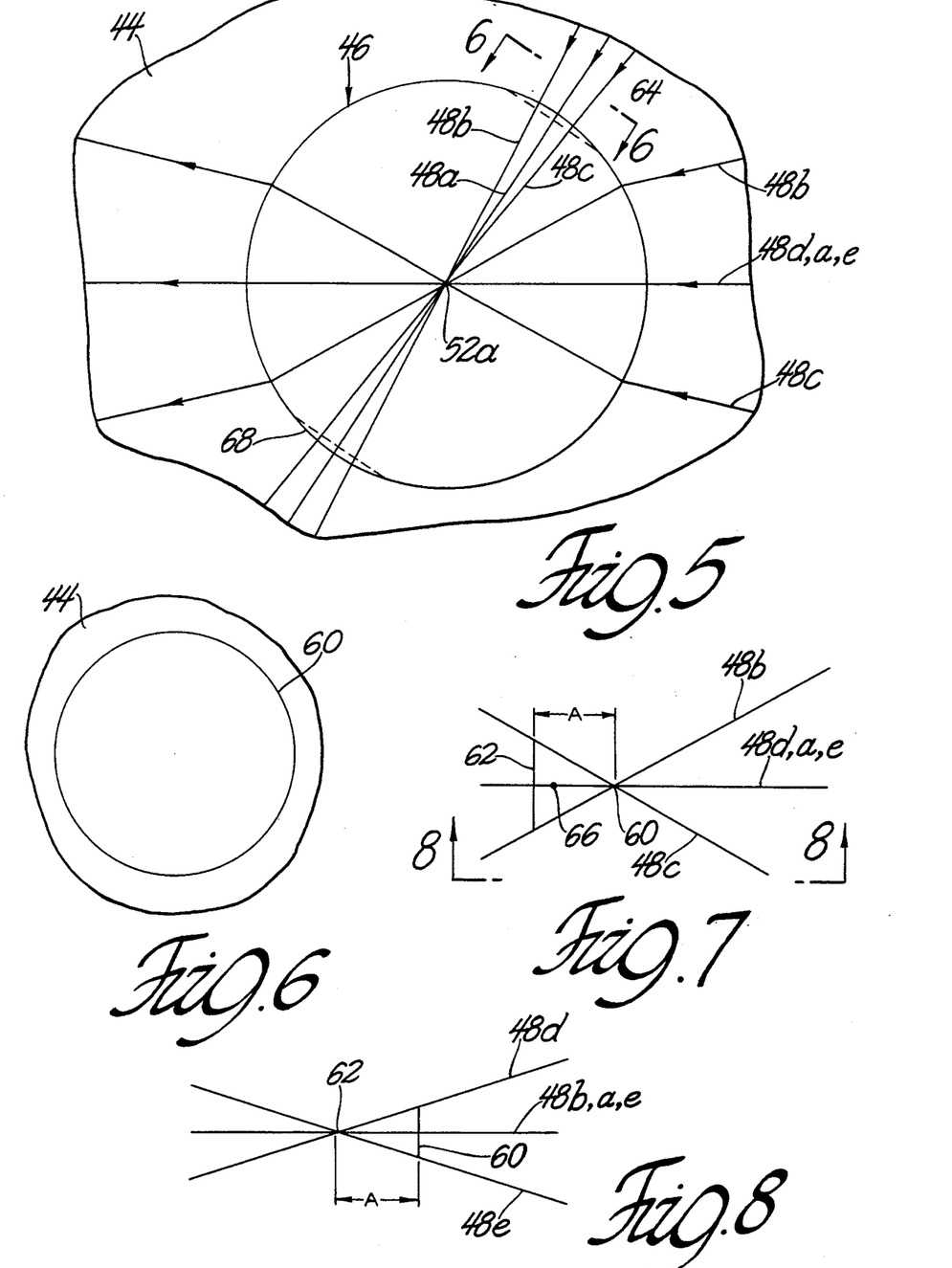
FIG. 5 is a detail view of an optional modification to the NLSAM.
FIG. 6 is a view taken along line 6—6 in FIG. 5.
FIG. 7 is schematic diagram showing a greatly enlarged view of the focal areas of light rays making their first pass through the NLSAM shown in FIG. 5.
FIG. 8 is a view taken along line 8—8 in FIG. 7.

FIG. 5 is a detail view of NLASM 46 showing an optional modification thereof where NLASM 46 and block 44 have indexes of refraction that varying quite slightly, for example by 0.0001%. In FIG. 5 the bending of rays 48b and 48c caused by the difference in refraction indexes is highly exaggerated for purposes of illustration. The bending is caused by the simply curved surface areas of the cylindrically shaped NLASM 46 through which rays 48b, 48a, and 48c pass. Rays 48d, 48a and 48e are normal to tangents at the boundary of NLASM 46 in and therefore will not be bent by the interface between NLASM 46 and block 44. For purposes of illustration, rays 48d 48a and 48e are selected to define a first plane perpendicular to a second plane defined by rays 48b 48a and 48c.

FIG. 7 is a detail view of focal zone 52a of FIG. 5 wherein light rays travel into zone 52a along a set of third, convergent planes. Note that rays 48b, 48a and 48c in FIG. 7 define cross sections of the third planes, that the third planes meet at line 60, and that the third planes are perpendicular to the aforementioned second plane. Also, light rays enter into zone 52a along a set of fourth, convergent planes. Note that rays 48d, 48a and 48e in FIG. 8 define cross sections of the fourth planes, that the fourth planes meet at line 62 and that the fourth convergent planes are perpendicular to the aforementioned first plane. Thus focal zone 52a has two light concentration zones, at lines 60 and 62, rather than a single focal zone or point, whereby the fluence levels where focal area 52a begins and ceases clamping is increased. The exact values for the length of line 60, the length of line 62 and the distance "A" between them will vary depending on the maximum fluence level desired for NLASM 46, although for most applications these values will be in the range of nanometers or picometers. It may also be desired to make line 60 up to one or more orders of magnitude longer than line 62 such that clamping occurs at the lines within overlapping but different ranges of fluence.

Referring again to FIG. 5, rays 48b, 48a, and 48c are shown exiting cell 44 and later re-entering the cell through convex circular lens 64 integral with cell 44. Lens 64 focuses these rays at a point in cell 46, this point preferably being at a location between lines 60 and 62, as at point 66 shown in FIG. 7. Concentration of rays at point 66 results in an additional clamping range, which is lower than clamping ranges for lines 60 and 62. It is preferable that the clamping range of point 66 somewhat overlap the clamping range of either line 60 or line 62, whichever of the lines' clamping ranges is lower. Rays 48b, 48a and 48c now exit cell 46 through a second circular lens 68 and thence to lens 58 (FIG. 1). Lenses 60 and 68 are preferably constructed to be concentric with zone 52a, whereby these lenses do not affect the direction of light rays concentrating at or leaving zone 52a.

Figures 9A, 9B, 9C:
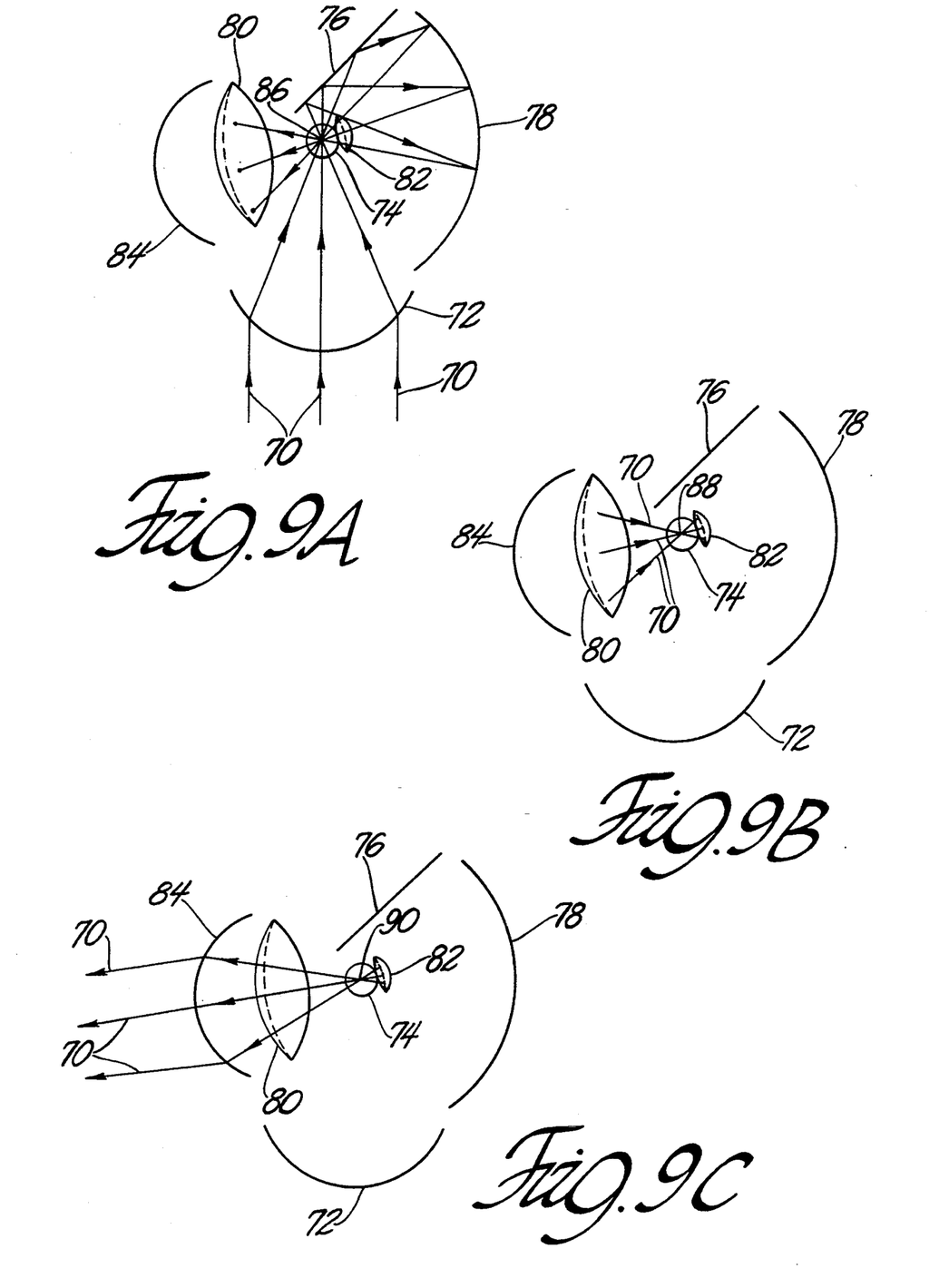
FIGS. 9A, 9B and 9C are semi-schematic diagrams showing the routing of light rays through still another embodiment of my invention.

FIGS. 9A, 9B and 9C show in semi-schematic form still another embodiment of my invention. As seen in FIG. 9A, parallel laser light rays 70 pass through lens 72 into NLASM 74 and concentrate at focal point or zone 86 within the NLASM. Rays 70 exit the NLASM and reflect off flat mirror 76 toward a relatively large concave mirror 78, which reflects and reconcentrates the rays within the now expanded plasma body formed at focal area 86. Rays 70 again exit NLASM 74, and strike a downward tilted concave mirror 80. As seen in FIG. 9B, rays 70 are now reflected and concentrated downward to focal area 88 in NLASM 74, focal area 88 being sufficiently remote from focal zone 86 so that rays 70 do not pass through plasma at zone 86. Rays 70 exit NLASM 74 for a third time and strike another downward tilted concave mirror 82. As seen in FIG. 9C, mirror 82 reconcentrates rays 70 so that the meet at focal area 90 below focal area 88 in NLASM 74. Focal area 90 is sufficiently close to focal area 88 so that the portions of rays 70 passing through zone 90 also pass through plasma spreading from zone 88. Rays 70 exit the NLASM for a final time and pass through concave lens 84, whereupon rays 70 resume a mutually parallel relation.

Figure 10:
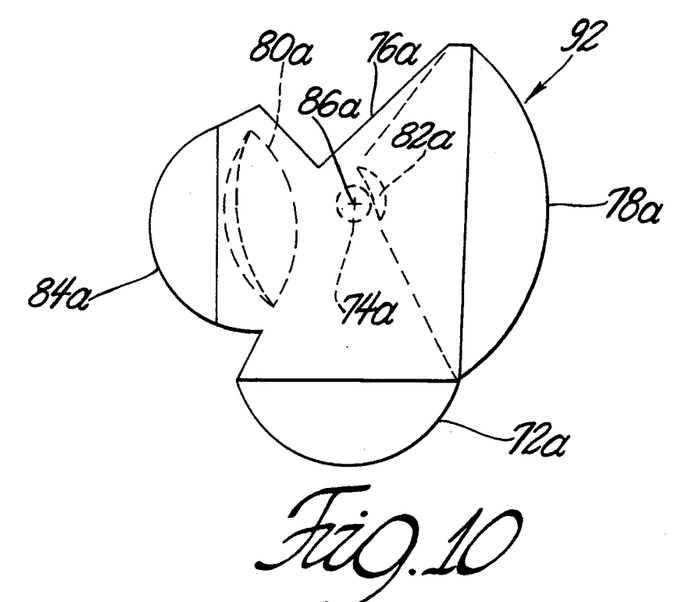
FIG. 10 is a plan elevational view of a glass or acrylic block incorporating the light routing scheme of FIGS. 9A, 9B and 9C.
Figure 11:
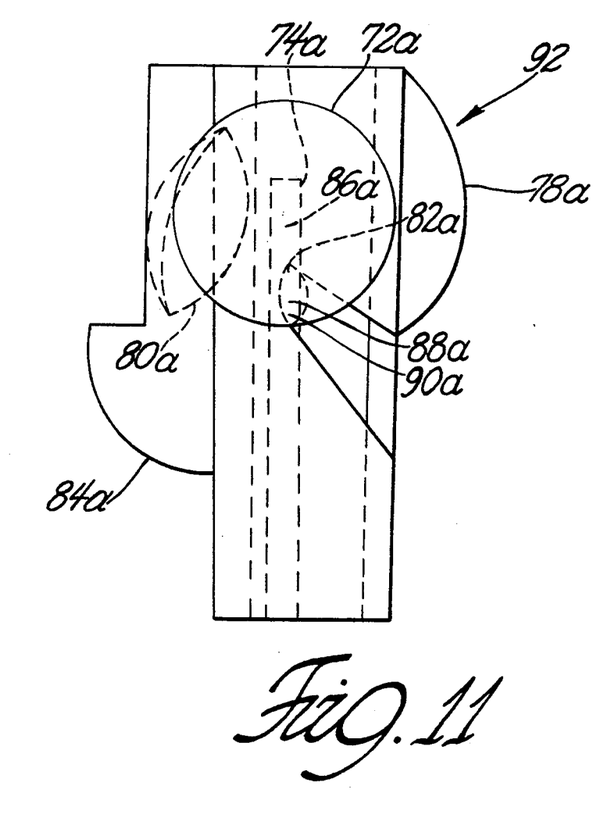
FIG. 11 is a front elevational view of the block shown in FIG. 10.

A block of acrylic plastic, quartz, glass or other suitable transparent material incorporating the scheme of FIGS. 9A, 9B and 9C is shown in FIGS. 10 and 11. For clarity in showing the block, light rays are omitted from FIGS. 10 and 11. Also for clarity in those figures, lines actually visible through the block are represented as hidden lines if they are behind a portion of the block. Block 92 has reference numerals with a suffix "a" that correspond to similar but unsuffixed numerals in FIGS. 9A through 9C, so that elements in block 92 are numerically related to their analogues in FIGS. 9A through 9C. For example, lens 72 in FIGS. 9A, 9B and 9C corresponds to lens 72a in FIGS. 10 and 11.

I wish it to be understood that I do not desire to be limited to the exact details shown and described herein since obvious modifications will occur to those skilled in the relevant arts without departing from the scope and spirit of the following claims.

I claim:

1. An optical system for selectively passing light below a given fluence while blocking light above the given fluence, the system comprising:
   a NLASM;
   a first focal zone within the NLASM;
   a first receiving means for concentrating within the first focal zone parallel light rays entering the system;
   a second focal zone within the NLSAM;
   repassing means for redirecting and refocussing light rays leaving the first focal zone into the second focal zone;
   a second receiving means optically downstream of the repassing means for receiving exiting light rays that have passed through the second focal zone, the second receiving means placing the exiting light rays in mutual parallel relation.

2. The optical system of claim 1 wherein the first receiving means, the repassing means and the second receiving means are all defined by a block of transparent material surrounding the NLASM.

3. The optical system of claim 2 wherein the block adjacently interfaces with the NLASM and has the same index of refraction as the NLASM.

4. The system of claim 2 wherein:
   the NLASM has a different index of refraction than the block;
   the NLASM defines a curve at an interface between the NLASM and the block such that light entering the NLASM through the interface concentrates along a first line of discrete length within the NLASM and subsequently concentrates at a second line of discrete length within the NLASM.

5. The system of claim 4 wherein one of the lines is at least one order of magnitude longer than another of the lines.

6. The system of claim 4 wherein;
   the curve is a first curve and the interface is a first interface;
   the NLASM defines a second curve at a second interface between the NLASM and the block;
   the second curve is generally parallel to the first curve and is disposed on the opposite side of the first focal zone from the first curve.

7. The system of claim 4 wherein the curves are concentric with a common axis running through the first focal zone.

8. The system of claim 4, further comprising:
   a first NLASM lens on the NLASM accepting convergent light rays from the repassing means, the NLASM lens curved so as to avoid altering the directions of the convergent light rays;
   a second NLASM lens on the NLASM opposite the first NLASM lens, the second NLASM accepting light rays passed through the second focal zone from the first NLASM lens, the second NLASM lens curved so as to avoid altering the directions of the light rays passed through the second focal zone.

9. The optical system of claim 1 further comprising a plasma originating in the first focal zone and expanding to include the second focal zone.

10. The optical system of claim 9 further comprising:
    a third focal zone within the NLASM remote from the first and second focal zones so as to be outside the plasma at the first and second focal zones;
    ray manipulation means for redirecting and refocussing light rays from the second focal zone at the third focal zone.

11. The system of claim 10 wherein the ray manipulation means comprises a spherically concave mirror open toward the third focal zone.

12. The optical system of claim 1 wherein the repassing means is also a means to delay for a preselected time entry of light rays from the first focal zone into the second focal zone.

* * * * *